UNITED STATES PATENT OFFICE.

ARMIN GROB, OF BASEL, SWITZERLAND, ASSIGNOR TO BASLE CHEMICAL WORKS, OF BASEL, SWITZERLAND.

VAT DYE AND PROCESS OF MAKING SAME.

No. 915,346.   Specification of Letters Patent.   Patented March 16, 1909.

Application filed October 6, 1908. Serial No. 456,436.

*To all whom it may concern:*

Be it known that I, ARMIN GROB, a citizen of the Swiss Republic, and resident of Basel, Switzerland, have invented a new Vat Dyestuff and a Process of Making Same, of which the following is a full, clear, and exact specification.

I have found that by reacting with acenaphthene-quinone upon a derivative of 3-oxy-1-thio-naphthene having a substituent in the benzene nucleus a new vat-dyestuff is obtained. In this reaction the derivative of 3-oxy-1-thio-naphthene can be produced in the reaction mass itself by heating the corresponding derivative of phenylthioglycollic-orthocarboxylic acid with the acenaphthene-quinone employed. The said reaction can further be carried out in the presence or not of a dissolvent or of a condensing agent. The vat-dyestuffs thus obtained constitute in dry state, yellow-red to brownish powders which dissolve in concentrated sulfuric acid to green to blue solutions from which they are precipitated again on addition of water and are somewhat difficultly soluble in hot benzene to reddish orange to orange solutions. They dye unmordanted cotton from reduced alkaline vat tints being after oxidation red to orange.

The manufacture of the new dyestuffs is explained by the following examples:

Example I: 25 parts of 2-phenylthioglycollic-4-chloro-1-carboxylic acid, of the formula

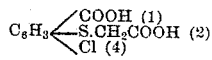

and 18.5 parts of finely powdered acenaphthene-quinone are heated together quickly in a bath at 220–250° C. until the elimination of water and formation of dyestuff are at an end; the red-brown mass is exhausted of the dyestuff by extraction with much boiling benzene. The condensation can also be effected by heating to the same temperature in presence of an indifferent solvent, for instance 50 parts of naphthalene; or the mixture may be heated for some time in presence of 100 parts of acetic anhydrid and 3 parts of sodium acetate in a bath at 135–150° C., a reflux condenser being used.

The dyestuff is a yellow red to brownish crystalline powder. It dissolves in concentrated sulfuric acid to a green solution from which it is precipitated again on addition of water. In hot benzene it is somewhat difficultly soluble to a reddish-orange solution. When finely divided it easily yields a violet vat by treatment with alkaline sodium hydrosulfite solution, from which vat cotton without a mordant and subsequently subjected to oxidation is dyed yellow red tints.

In this example the phenyl-thio-glycollic-4-chloro-1-carboxylic acid employed is during the heating of the reaction mass transformed intermediary into the corresponding chloro derivative of 3-oxy-1-thionaphthene and can therefore be replaced by this latter.

In this example for the 2-phenylthioglycollic-4-chloro-1-carboxylic acid, or the oxy-thionaphthene derivative obtainable therefrom, may also be substituted the corresponding bromo-compounds in which the bromin is in the 4-position.

Example II: 20 parts of 4-ethylthio-oxythionaphthene of the formula

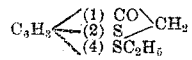

and 18.5 parts of finely pulverized acenaphthene-quinone are suspended or dissolved in 1000 parts of boiling spirit, then mixed with an aqueous solution of 3 parts of calcined soda or a corresponding quantity of ammonia or sodium hydroxid in 100 parts of water, and kept boiling in a reflux apparatus until separation of the dyestuff is complete. The dyestuff, an orange red precipitate, is filtered, washed and dried. It dissolves somewhat difficultly in hot benzene to an orange solution. In concentrated sulfuric acid it dissolves to a greenish-blue solution and is again precipitated on addition of water. With alkaline sodium hydrosulfite solution a vat is obtained with which cotton without a mordant can be dyed orange tints.

In this example for the 4-ethylthio-oxythionaphthene may be substituted 4-ethoxy-oxythionaphthene.

What I claim is:

1. The described process for the manufacture of vat-dyestuffs consisting in heating acenaphthene-quinone with a derivative of 3-oxy-1-thionaphthene having a substituent in the benzene nucleus.

2. The described process for the manufacture of vat-dyestuffs consisting in heating acenaphthene-quinone with a derivative of phenylthioglycollic-orthocarboxylic acid, this latter being intermediary transformed into the corresponding derivative of 3-oxy-1-thionaphthene, which reacts upon the acenaphthene-quinone.

3. The described process for the manufacture of a red vat-dyestuff consisting in heating acenaphthene-quinone with a halogen derivative of 3-oxy-1-thionaphthene.

4. The described process for the manufacture of a red vat-dyestuff consisting in heating acenaphthene-quinone with a halogen, derivative of phenylthioglycollic-orthocarboxylic acid, this latter being intermediary transformed into the corresponding halogen derivative of 3 oxy-1-thionaphthene.

5. The described process for the manufacture of a red vat-dyestuff consisting in heating acenaphthene-quinone with a chloro derivative of 3-oxy-1-thionaphthene.

6. The described process for the manufacture of a red vat-dyestuff consisting in heating acenaphthene-quinone with 2-phenyl-thio-glycollic-4-chloro-1-carboxylic acid, this latter being intermediary transformed into the corresponding chloro derivative of 3-oxy-1-thionaphthene.

7. As new products, the herein described vat-dyestuffs derived from acenaphthene-quinone and a derivative of 3-oxy-1-thionaphthene, constituting in dry state, yellow-red to brown powders, dissolving in concentrated sulfuric acid to green to blue solutions from which they are precipitated again on addition of water, somewhat difficultly soluble in hot benzene to orange to reddish orange solutions and dyeing cotton from reduced alkaline vat tints. being after oxidation yellow-red to orange.

8. As a new article of manufacture, the herein described red vat-dyestuff derived from acenaphthene-quinone and a chloro derivative of 3-oxy-1-thionaphthene, constituting, in dry state, a yellow-red to brownish crystalline powder, dissolving in concentrated sulfuric acid to a green solution from which it is precipitated again on addition of water, somewhat difficultly soluble in hot benzene to a reddish orange solution and yielding by alkaline reduction a violet vat from which cotton is dyed tints being after oxidation yellow-red.

In witness whereof I have hereunto signed my name this 25th day of September 1908, in the presence of two subscribing witnesses.

ARMIN GROB.

Witnesses:
ERNST WAGNER,
AMAND RITTER.